United States Patent [19]

O'Keeffe et al.

[11] Patent Number: 4,697,167
[45] Date of Patent: Sep. 29, 1987

[54] SYNC PATTERN ENCODING SYSTEM FOR DATA SECTORS WRITTEN ON A STORAGE MEDIUM

[75] Inventors: Michael J. O'Keeffe; James M. Graba, both of Longmont; George I. Noyes, Boulder, all of Colo.

[73] Assignee: Storage Technology Corporation, Louisville, Colo.

[21] Appl. No.: 838,181

[22] Filed: Nov. 21, 1985

Related U.S. Application Data

[63] Continuation of Ser. No. 533,826, Sep. 19, 1983, abandoned.

[51] Int. Cl.[4] .............................................. H03M 5/00
[52] U.S. Cl. ................................ 340/347 DD; 360/40
[58] Field of Search ................ 340/347 DD; 369/59, 369/60; 360/40; 375/110; 370/47

[56] References Cited

U.S. PATENT DOCUMENTS 4,503,420  3/1985  Rub et al. ..................... 360/40 X

Primary Examiner—T. J. Sloyan
Attorney, Agent, or Firm—Woodcock Washburn Kurtz Mackiewicz & Norris

[57] ABSTRACT

A system and method for generating a unique sync pattern that may be appended to a selected data sector of a disk storage system. The data to be stored in the disk storage system is encoded in accordance with a desired fixed rate run-length limited code, such as a 2,7 code. The unique sync pattern is generated by first encoding a prescribed data word in accordance with the desired code. At least one bit of the encoded prescribed data word is then changed in a manner such that the changed encoded word still complies with the coding rules of the desired code, yet the resulting bit pattern does not represent any valid sequence of data in accordance with the desired code. Hence, the changed encoded word may be readily distinguished from data, thereby providing the synchronization function, while still being handled and processed by the same encoding/decoding circuitry as is employed to handle and process the data.

7 Claims, 12 Drawing Figures

SYNC PATTERN ENCODING SYSTEM FOR DATA SECTORS WRITTEN ON A STORAGE MEDIUM

This is a continuation of application Ser. No. 533,826, filed Sept. 19, 1983, abandoned.

BACKGROUND OF THE INVENTION

This invention relates to optical data storage systems, and more particularly to systems for encoding data represented by binary signals within such an optical system, and even more particularly to a system for encoding a unique repetitive pattern in a sector of data that has been encoded with a variable word length run-length limited code.

Over the past two decades or so, there have been two major trends in the data processing industry that have worked together to revolutionize the way that information is gathered, stored, and interpreted. The first trend has been the expansion of technological sophistication, as exemplified by the microcomputer chip. That is, computing power, which once required roomsful of equipment and kilowatts of electrical power to operate, can now be found in very small silicon chips. The second trend has been the cost of purchasing such computing power. Particularly in the area of memory—as costs have dropped and capacities have increased—there has been an inevitable rush to take advantage of the newfound memory space and fill it with information. In this respect, the demand for more memory and storage space has always seemed to outstretch the available supply of such memory space.

Unfortunately, for users with exceptionally large data storage needs, the magnetic-based storage peripheral devices adapted for use with high performance computers (i.e., magnetic tape and disk drives) have not been able to fill the need for more storage space. Traditionally, the need for more storage space in such large data storage systems has been addressed by merely adding additional magnetic disk drives and/or magnetic tape drives. This has been costly both in terms of expense (purchase/lease price plus maintenance costs) and floor space. Moreover, even though there have been some significant strides in recent years with respect to increasing the data storage capacity of these magnetic-based storage devices, the theoretical design limits of such systems are rapidly being approached. Hence, merely adding more magnetic disk or tape drives is no longer viewed as a practical alternative to the ever increasing need for storing more and more information. It is therefore apparent that a new type of data storage system is needed in order to handle the large amounts of data that information users need to store.

Optical technology—that is, the technology of using a laser beam to burn or otherwise mark very small holes on a suitable medium in a pattern representative of the data to be stored, which pattern can subsequently be read by monitoring a laser beam directed through or reflected off of the previously recorded marks—has been available in laboratories for some time. Unfortunately, however, such laboratory technology has not provided a cost effective alternative for use in data storage products. This is because the optical components have tended to occupy entire rooms and the power associated with operating the laser and associated components has been enormous. Further, such laboratory systems are not easily interfaced with existing high performance computer systems. That is, the techniques used to format and input the data have been totally incompatible with more conventional formatting and data processing techniques used in the magnetic-based storage systems. Moreover, the few optical storage systems that have been commercially introduced in the last few years have primarily related to the storing of video signals (image storing devices) as opposed to the storing of digital information. The few digital optical storage devices that do exist do not represent a viable alternative or supplement to the existing peripheral magnetic-based storage devices for the user of large data bases of information.

A continuing problem that has existed with whatever type of data storage system is used is the problem of minimizing the errors that occur during read or write. The number of errors that occur in such a system is typically measured by a parameter referred to as the "bit error rate." This parameter is typically expressed as a number indicating the number of good bits of digital data that can be obtained for every bad bit of data that occurs. Thus, a bit error rate of 100,000 (10E+5) indicates that 100,000 bits of data can be read or played back before a bad or incorrect bit of data will be encountered. In order to provide a viable data storage system, bit error rates in excess of 10E+12 are generally required.

Numerous Error Correction codes (ECC) and similar error correcting schemes are known in the art in order to improve the bit error rate of data processing systems. The very existence of such ECC schemes evidences the continuing and recurring problem of reducing errors that are introduced into such processing systems.

Before any ECC or similar scheme can be employed, however, there must be an accurate method invoked for detecting the data that has been stored. This requires some sort of synchronization of a clock signal with the detected data bit signals. This synchronization is typically realized with a phase locked loop (PLL) circuit wherein the data transitions appearing in the detected data bit signal are compared with the phase of a clock signal generated by a VFO (variable frequency oscillator) circuit. Errors between the data transitions and clock phase are used to vary the frequency (period) of the VFO signal so as to lock the phase of the two signals together.

In many digital data handling systems, such as in the optical storage system herein disclosed, a character of information is represented by a unique combination of 8 binary bits sometimes referred to as a byte. Generally, information is transferred between units of a data processing system and even within units on a byte basis, usually serial-by-byte. The storage of this data within the system, however, is sometimes done on a serial-by-bit, serial-by-byte basis, as in a magnetic or optical disk storage unit. Information is therefore presented to the disk in a serial-by-bit, serial-by-byte fashion for recording on one of a plurality of concentric recording tracks in the form of magnetic transitions or optical marks occurring at predefined bit times. The recording process generally involves operating on a serial bit stream corresponding to a sequence of characters.

It is therefore necessary not only to detect bit-by-bit information, but also to detect byte information, i.e., where one byte ends and another begins. Because bytes are typically arranged in serial groups, often referred to as words, it is also necessary to detect the boundary of such groups of bytes. This process of detecting byte and byte-grouping boundaries is referred to as synchronization. Special marks or patterns may be encoded with the data in order to make synchronization possible. Other schemes employ special data or clock tracks wherein synchronization information is permanently stored.

A class of codes have been developed in the art which are referred to as run-length limited codes. The characteristic of these codes is that a transition is guranteed at least every "n" bit times. In these codes it is also guaranteed that adjacent transitions will be separated by at least "d" bit times. Practical examples for "d" and "n" are 2,7 and 1,4. A 2,7 run-length limited code therefore would guarantee at least two binary zeros between adjacent binary ones and no more than seven binary zeros in a sequence. Having a minimum or maximum number of zeros between adjacent binary ones ensures that some bit transitions will always occur, thereby providing a signal onto which the clock signals generated by the PLL circuits may lock.

Run-length limited codes are also classified as fixed or variable rate codes. The fixed rate run-length limited code implies that the number of bits used to represent a code word is a fixed multiple of the number of bits in the data word prior to encoding, e.g., a two bit data word is encoded as a four bit code word, a three bit word is encoded as a six bit code word, etc. In a variable rate run-length limited code, there is no fixed relationship maintained in the encoding process between the number of bits in the data word and the number of bits in the code word.

In systems which do not employ run-length limited codes, the sync pattern is generally a series of alternate ones and zeros and can be generated quite easily by serializing the same one byte a number of times to generate the appropriate signal to the encoder. The problem becomes more complex however where the encoder functions to encode the serial input stream corresponding to the sequence of eight bit characters into a run-length limited code signal. While additional hardware may be used to solve the complexity of the problem, which additional hardware might add additional cost to the function, the main disadvantage is the cost of the control hardware which would be required, especially where the part of the control hardware could be achieving some additional control function during the time the sync pattern has to be encoded or decoded. The present invention provides a system for encoding and decoding a sync pattern where the same basic circuitry used to perform the encode/decode function of the fixed rate run-length limited code for the data may also be used to encode and decode the sync pattern.

SUMMARY OF THE INVENTION

In accordance with the present invention, a system is provided for encoding a prescribed sync pattern in resynchronizable data sectors that are written within blocks of data that are stored on concentric data tracks on the disk or other storage medium. Advantageously, the sync pattern selected is compatible with (may be easily encoded/decoded by) the circuitry used to encode and decode the particular run-length limited code that is used in connection with the handling and processing of the data. Moreover, the sync pattern is unique and will not be confused with the data.

The present invention is especially well suited for use in an optical disk storage system that includes a platter or media upon which the data is written, and a drive into which the platter is inserted when it is desired to read or write data. A storage controller may be used to provide necessary interface between a host CPU and the optical disk drive, if needed. If used, the storage controller advantageously allows other types of peripheral storage devices to be used with the CPU along with the optical storage system. The host CPU initiates the request to read or write data to the optical drive.

In a preferred embodiment, the media or "platter" upon which the data is stored is physically housed in a cartridge when the platter is not mounted within the drive. The entire cartridge is inserted into the drive by the user when it is desired to read or write data therefrom or thereto. The drive automatically removes the platter from the cartridge and mounts it for rotation on a suitable spindle mechanism. The cartridge advantageously protects the platter when not in use and allows for the easy storage thereof. A suitable platter identification number is optically written onto the platter, as well as onto the cartridge by other visible means.

The data format on the platter includes bands, tracks, blocks, and sectors. The platter surface is divided into a prescribed number of concentric areas that are referred to as "bands." Each band contains a prescribed number of concentric data tracks therewithin upon which data may be written. Data is organized on each track in fixed length logical units referred to as "blocks." In the preferred embodiment, there may be short blocks and long blocks. Each track is physically divided into a fixed number of equal length segments referred to as "sectors". The sector is the smallest unit of encoded information. User data is encoded and written to specified types of sectors when stored on the platter. Other types of sectors are used to identify media defects and incompletely written user data. The sync pattern disclosed and claimed herein is used at the beginning of selected sectors, referred to as resynchronizable sectors.

Advantageously, three of the data bands on each platter are set aside for housekeeping and maintenance functions. One band is reserved as an index band in order to keep track of where various records are stored. Another band is a table of contents and keeps a history of the records stored and their respective status on that particular platter. The third band is used for maintenance and test purposes and provides some reference signals, pre-written on the platter, which can be used during various maintenance operations of the drive. Resynchronizable data sectors are used within all tracks of all of the data bands of the platter, including the three housekeeping and maintenance bands.

BRIEF DESCRIPTION OF THE DRAWINGS

The above and other objects, features, and advantages of the present invention will be more apparent from the following more particular description thereof presented in conjunction with the following drawings, wherein.

DESCRIPTION OF THE PREFERRED EMBODIMENT

The following description is of the best presently contemplated mode of carrying out the invention. This description is not to be taken in a limiting sense but is made merely for the purpose for describing the general principles of the invention. The scope of the invention should be determined with reference to the appended claims.

In order to better understand a preferred environment within which the present invention may be used, a discussion will first be given of an optical storage system that uses the invention described herein.

Figure 1:
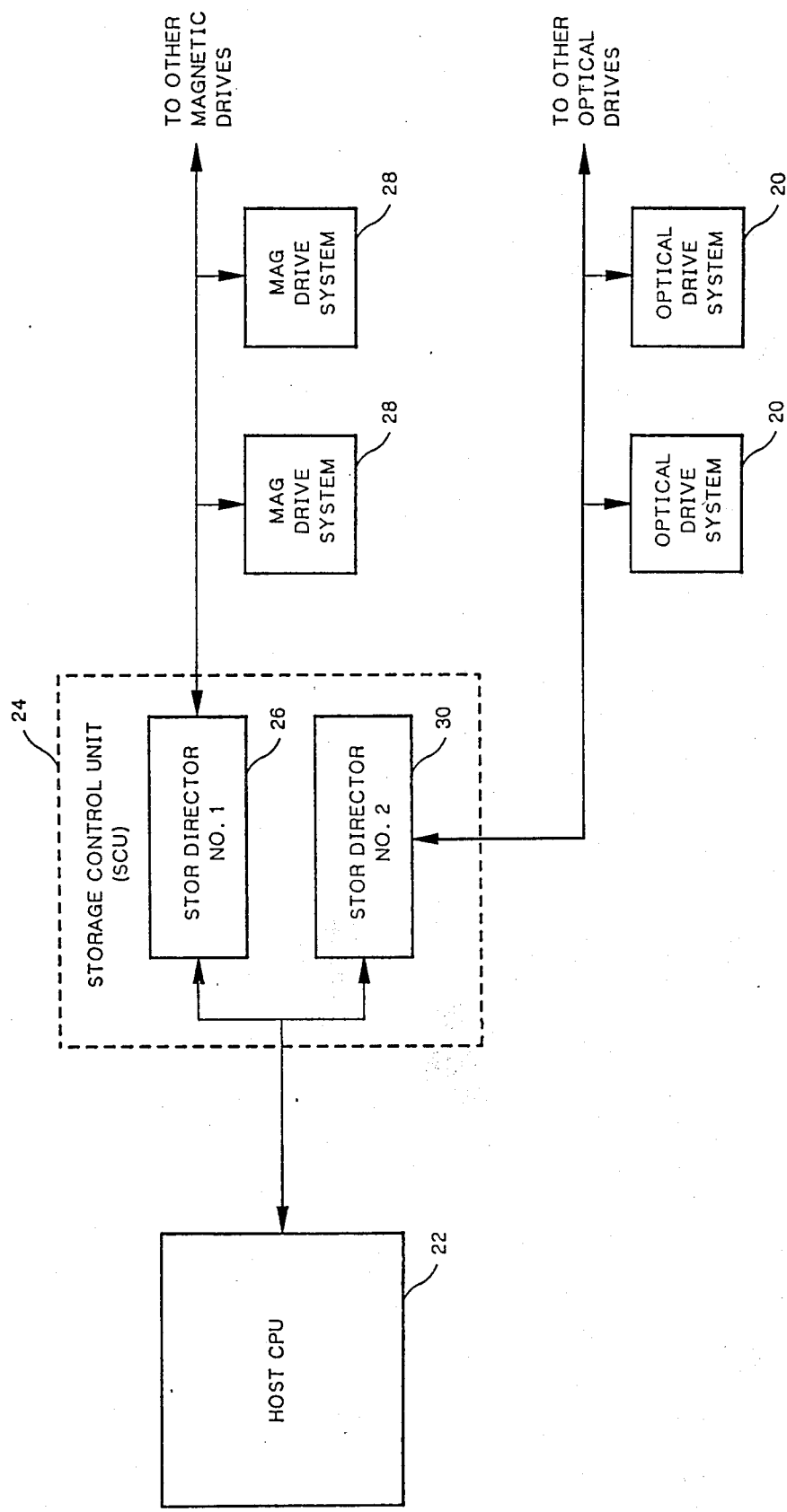
FIG. 1 is a block diagram illustrating how a plurality of optical drive systems may be coupled to a host CPU through a suitable control unit.

Referring to FIG. 1, an optical drive system 20 is adapted to be coupled to a host central processing unit (CPU) 22 via a storage control unit 24. Several optical drive systems 20 can be connected to the same control unit 24, if desired. Advantageously, the storage control unit 24 may include at least two storage directors. A first storage director 26 directs data to and from a plurality of magnetic drive systems 28. A second storage director 30 directs data to and from the optical drive systems 20. In this manner, both magnetic and optical storage devices may be coupled to the same host CPU 22 through the same storage control unit 24. This beneficial combination—of having both optical and magnetic storage devices coupled to the same host CPU through the same storage director provides a great deal of flexibility to the user of large amounts of data.

Advantageously, neither the host CPU 22 nor the storage control unit 24 need have hardware modifications made thereto in order to properly interact with the optical drive system 20. Depending upon the operating system employed within the CPU 22, a suitable interface program (software) may be needed to reside within the CPU 22 and/or the storage director 30.

In a preferred configuration, the storage control unit 24 may be an 8880 controller, manufactured by Storage Technology Corporation of Louisville, Colo. Such a control unit optionally provides either two or four storage directors. Therefore, a large number of disk storage peripheral devices, either optical or magnetic, can be coupled therethrough to a host CPU 22.

Figure 2:
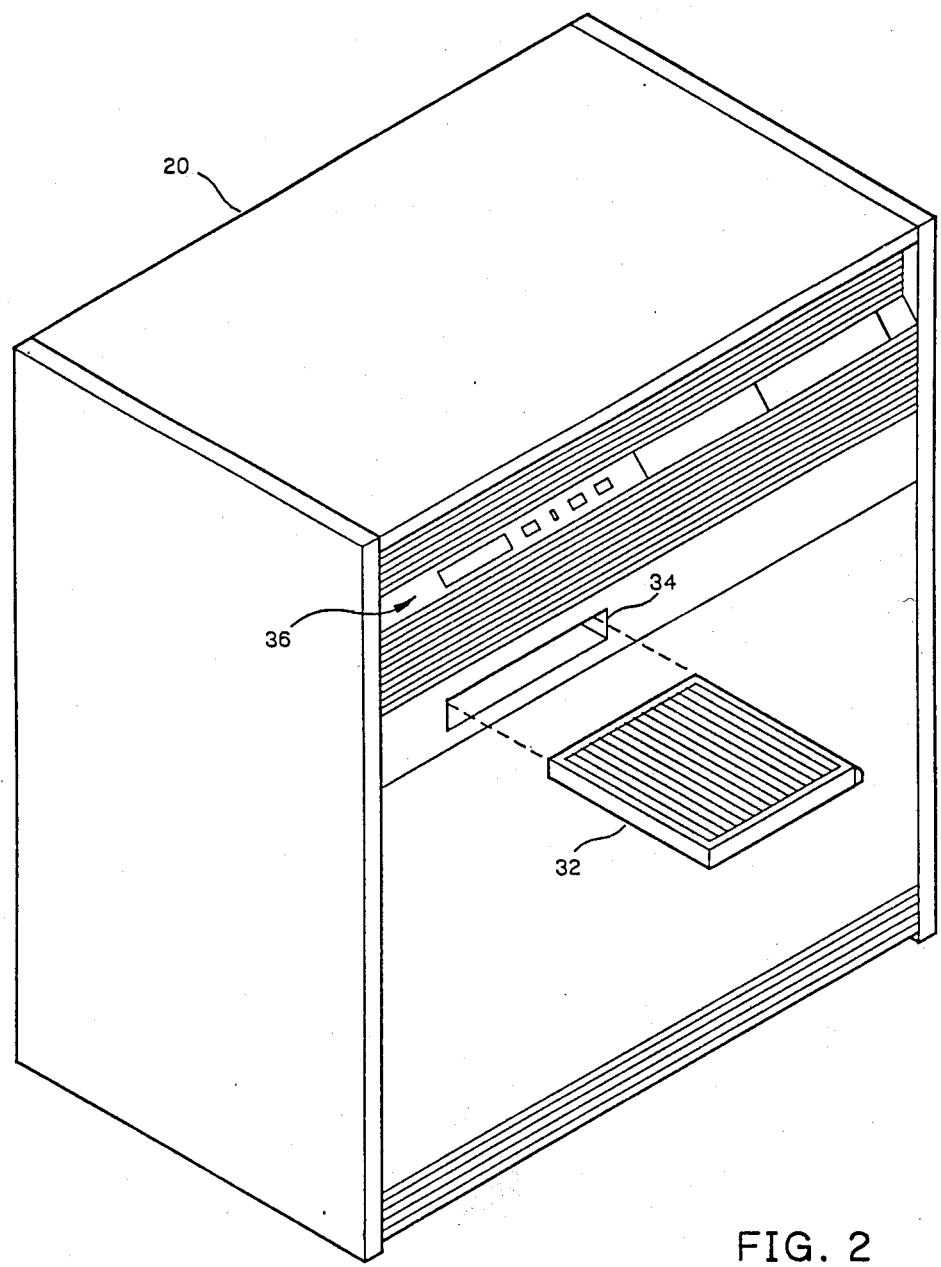
FIG. 2 is a perspective view of an optical drive system and shows how the platter cartridge is removably inserted thereinto.

Referring to FIG. 2, a perspective view of the optical drive system 20 is shown. A cartridge 32, having the media therein upon which the data is optically stored, is adapted to be inserted into an opening or slot 34 along the front face of the drive system 20. Operator controls and indicators 36 are also conveniently located along the front of the unit 20.

Figure 3:
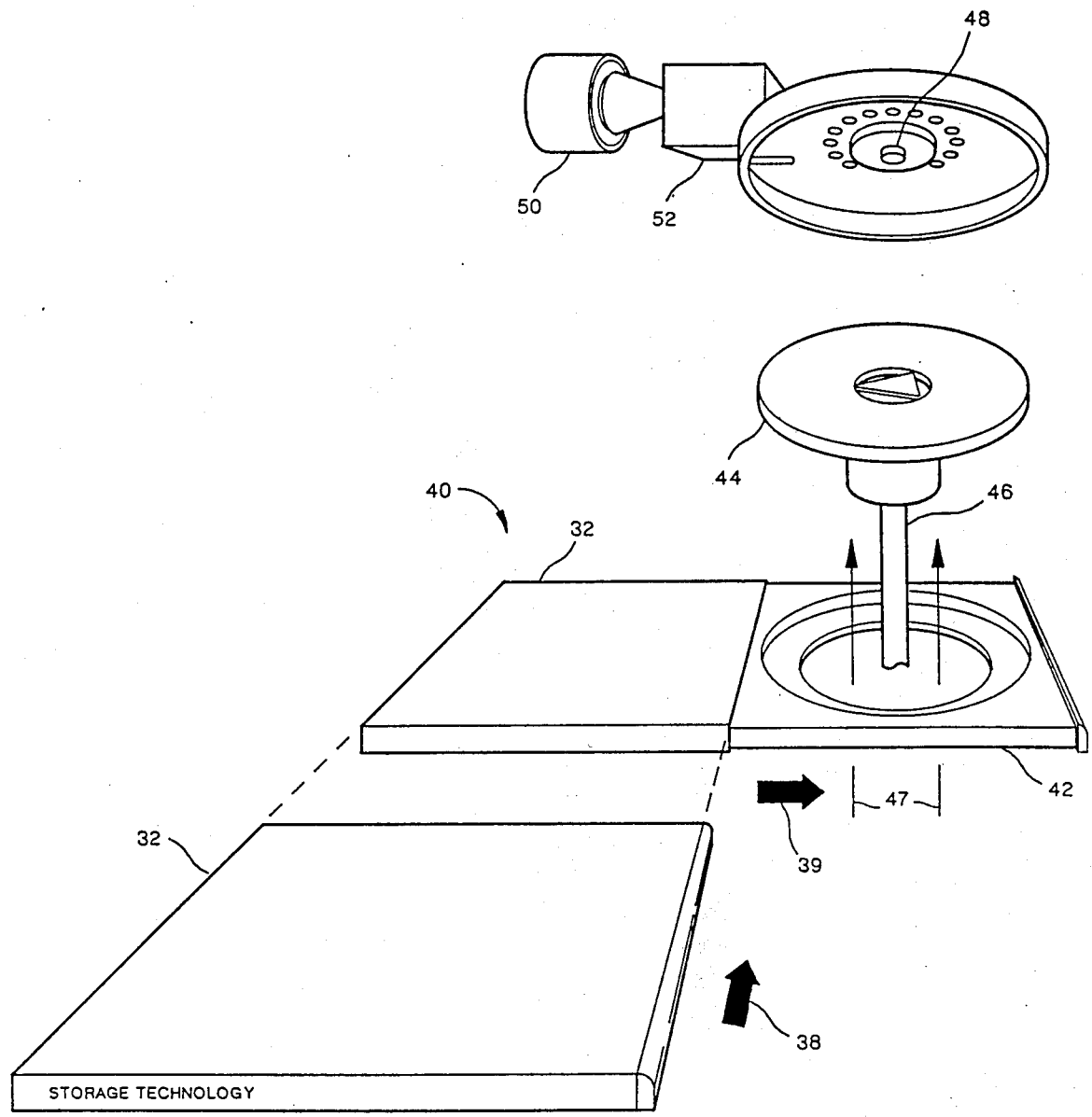
FIG. 3 is a mechanical schematic diagram illustrating how the platter is removed from the cartridge and mounted on a spindle of the optical drive system.

When a cartridge 32 is inserted into the drive 20, the media housed therein is removed from the cartridge as illustrated in FIG. 3. The cartridge 32 is pushed forward as indicated by the arrow 38 by the user. Once into the unit 20, at a position 40, the cartridge 32 is opened allowing a tray 42 holding the media or platter 44 to be slid out therefrom in the direction of the arrow 39. Once opened in this fashion, an elevator mechanism, schematically illustrated in FIG. 3 as a plunger 46, lifts the platter 44 away from the tray 42 in the direction indicated by the arrows 47. The platter 44 is then automatically centered and mounted on a spindle mechanism 48. An actuator 50 radially positions a read/write optical head 52 with respect to the mounted platter 44, thereby allowing access to a selected area on the surface thereof. Representative details associated with how an elevator mechanism 46 and the cartridge 32 may be configured are found in copending patent applications Ser. Nos. 499,750, now U.S. Pat. No. 4,545,045, and 499,669 now abandoned, both filed May 31, 1983, assigned to the same assignee as is the present application. Additional details associated with the manner in which the platter 44 may be centered on the spindle 48 may be found in copending patent applications Ser. Nos. 481,963, now U.S. Pat. No. 4,502,136, and 499,667, now U.S. Pat. No. 4,542,426 filed Apr. 4, 1983 and May 31, 1983 respectively also assigned to the same assignee as is this application.

Figure 4:
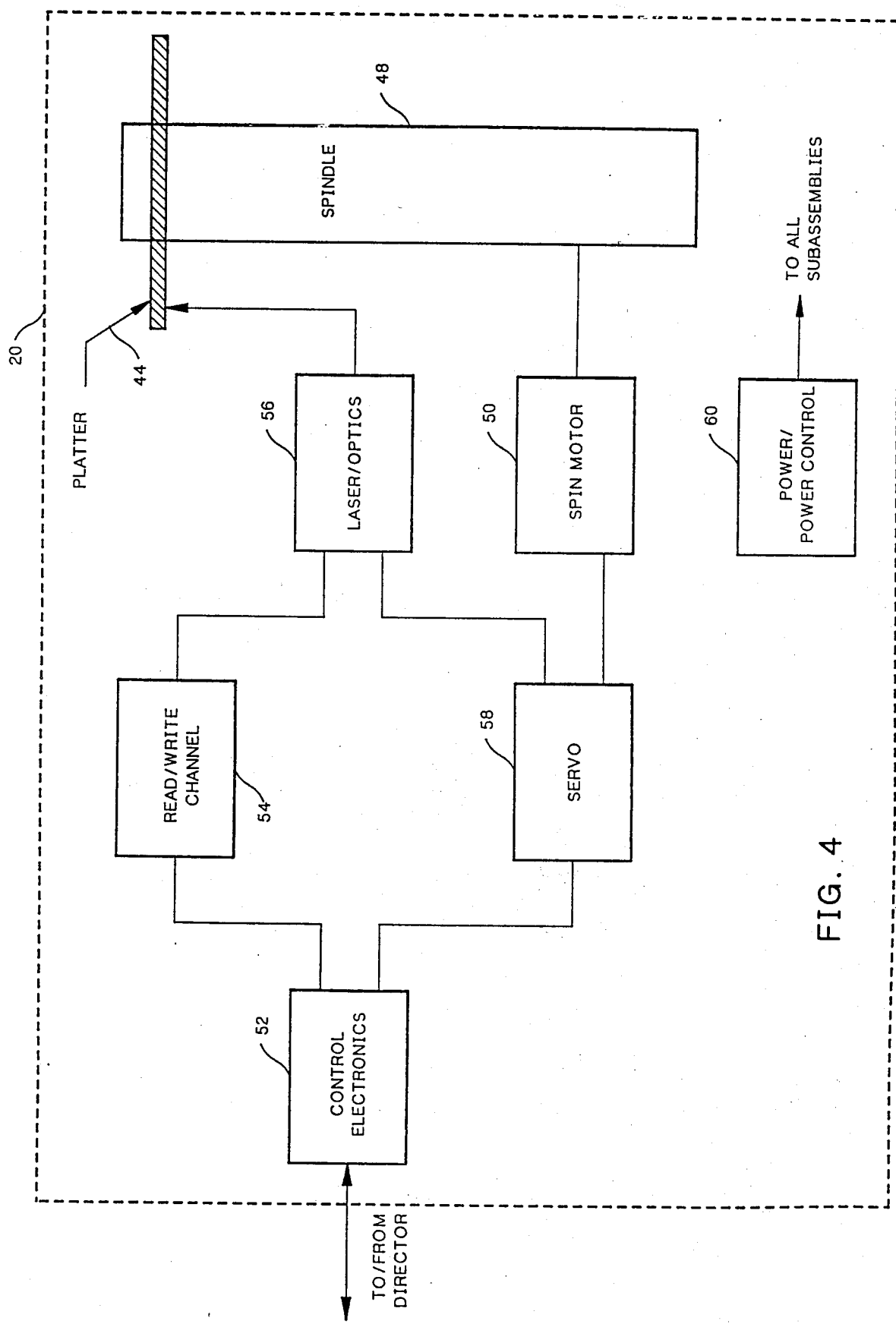
FIG. 4 is a block diagram of the optical drive system, and illustrates the principal elements used to read/write data from/to the platter.

Referring next to FIG. 4, a block diagram of the principle elements of the optical drive system 20 is shown. The platter 44 is mounted and centered on the spindle mechanism 48. A suitable spin motor 50 rotates the spindle 48, and hence the platter 44, at the desired rotational speed. Signals received from or sent to the storage director 30 (FIG. 1) pass through a control electronics section 52. The control electronics 52, as its name implies, provides the control necessary for communication with the storage control unit 24, including the interpretation of all commands received from the control unit 24. The control electronics 52, also, provide the necessary signals for controlling all of the hardware operations associated with the optical drive system 20.

A read/write channel 54 modulates a write laser diode in response to data signals received from the control electronics 52. The resulting modulated laser beam is directed through a laser/optics section 56 to the surface of the platter 44. Servo control for the spin motor 50 and the moving elements associated with the laser/optics 56 is provided by a servo system 58. The servo system 58 actually includes several servo systems, that provide track seeking and following, focusing, rotational speed control, and the like. A power/power control assembly 60 provides the AC/DC power required for the operation of the optical drive system 20. Primary power is secured from a suitable 50 or 60 Hz 3 phase power source.

Figure 5:
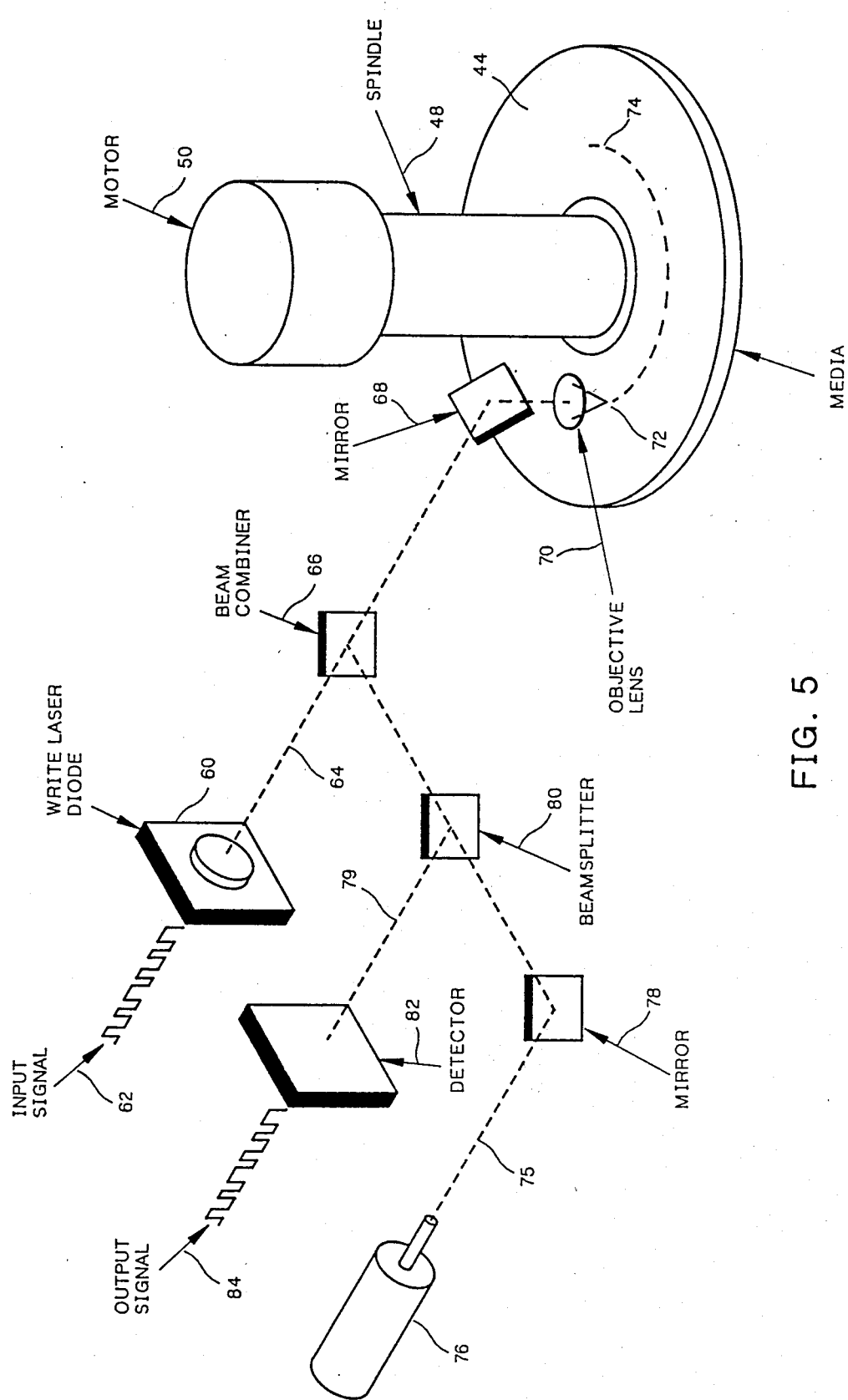
FIG. 5 is a simplified schematic depiction of the read/write process realized within the optical drive system.

In FIG. 5, a schematic representation of the read/write operation associated with the optical storage 20 is depicted. The platter 44, mounted and centered on the spindle mechanism 48, is spun by a spin motor 50. A write laser diode 60 is modulated by an input signal 62, which input signal represents the encoded binary digital data that is to be stored on the platter 44. A modulated laser beam 64, emitted from the write laser diode 60, is directed through a beam combiner 66, and is reflected from a suitable mirror or mirrors 68, through an objective lens 70 to a very small point 72 on the surface of the platter 44. Because the modulating signal is a binary (two level) signal, the modulated write beam is likewise a two level signal, having two power states associated therewith (typically "on" and "off"). The write laser beam 64 has sufficient power associated with its on or high power state to permanently mark the surface of the media 44 at the point 72. Because the platter 44 is spinning or rotating, a track of data 74 is thereby formed on the surface of the media or platter 44.

Conceptually, access to a desired track on the surface of the platter 44 is achieved by radially positioning the mirror 68 with respect to the platter 44 so as to provide coarse access to a desired band (several tracks) on the surface of the platter 44. The mirror 68 is then controllably tilted about a desired access point in order to direct the laser beam to a desired track within the accessed band. Further details associated with one possible embodiment of this type of servo system may be found in copending applications Ser. Nos. 438,133 and 503,955 filed Nov. 1, 1982 and June 13, 1981, respectively, both of which are now abandoned, assigned to the same assignee as is this application.

During a read operation, a read laser beam 75 is generated from a suitable laser source 76. This beam 75 reflects off a mirror 78, passes through a beam splitter 80, reflects off the beam combiner 66, and reflects off the mirror 68 so as to pass through the objective lens 70 to the desired point 72 on the desired data track 74. This beam reflects off of the surface of the platter 44 and follows the same path back through the objective lens 70, the mirror 68, and the beam combiner 66 to the beam splitter 80. At the beam splitter 80, this reflected read beam 79 is directed to a suitable detector 82. The detector 82 generates an output signal 84 in response to the intensity of the reflected read signal 79, which reflected signal will vary in intensity according to the marks that have been placed on the media or platter 44 by the modulated write beam 64. In this manner, the binary input signal 62, stored as optically detectable marks on the surface of the platter 44 by the modulated write beam, may be subsequently retrieved therefrom. Advantageously, accelerated life tests indicate that data stored on the media or platter 44 will remain written theron for as long as 10 years.

Figure 6A:
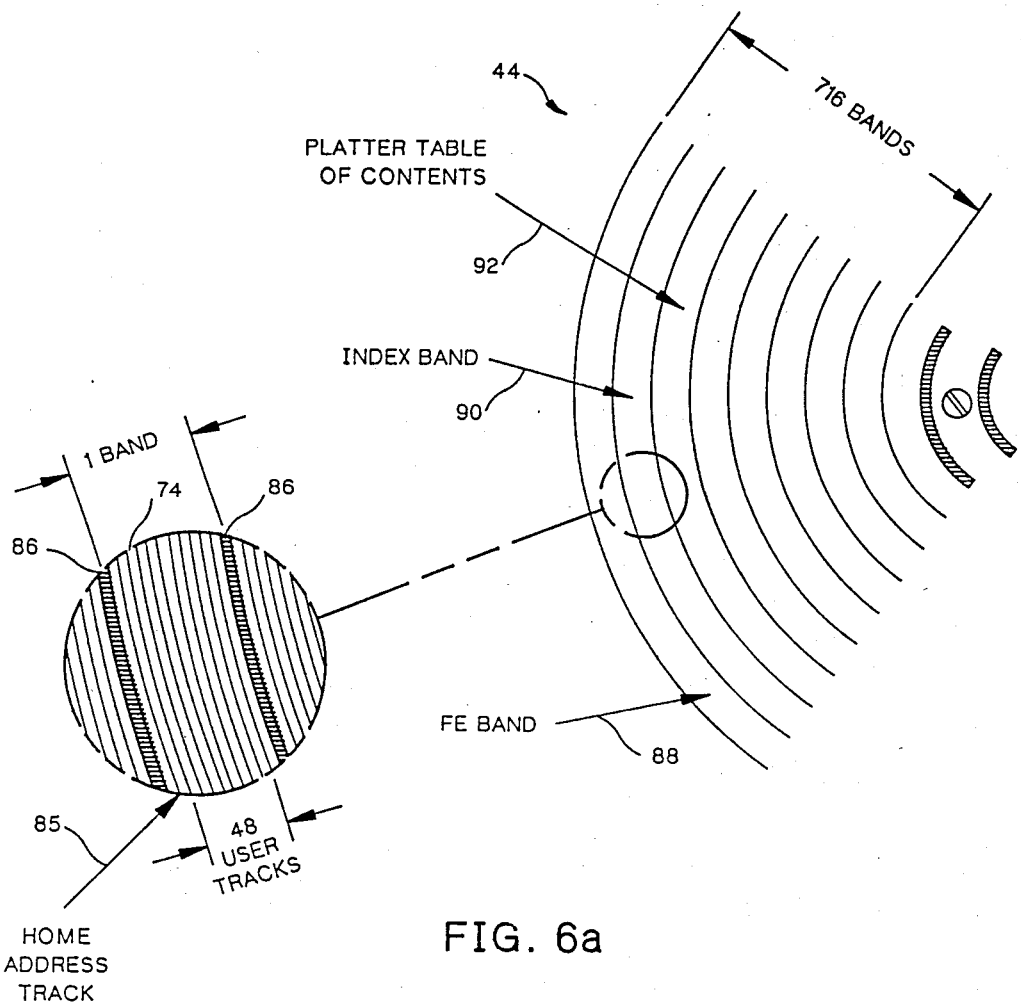
FIGS. 6a and 6b are representations of the data format and track organization, respectively, used on a platter or disk upon which data is stored.

Referring next to FIG. 6a, a schematic representation of the format of the platter 44 is shown. The surface of the platter 44 is divided into a desired number of concentric bands, each band having a desired number of data tracks located therein. In the preferred embodiment, for example, up to 716 bands are included on each platter 44. Each band, as shown in the enlarged portion of FIG. 6a includes a desired number of data tracks. In the preferred embodiment, there are 49 data tracks in each band, one track 85 of which is designated as a home address track. The other 48 tracks are used to store desired data. The bands are physically separated by coarse servo tracks 86. These coarse servo tracks are used in conjunction with the servo system in order to position the optical read/write head 52 (FIG. 3) at the correct radial position of the platter 44. The use of coarse servo tracks in this manner is fully described in the previously cited copending application, Ser. Nos. 438,133 and 503,955.

As noted in FIG. 6a, a first data band 88 is set aside as a Field Engineering (FE) band. The FE band 88 contains data selectively placed in the tracks thereof during the manufacture of the platter 44. (That is, much of the data in the FE band is prewritten on the platter 44, including the servo tracks 86 and the home address track, during the manufacture of the platter.) The purpose of the data in the FE band is to allow the field engineer to test the reading functions of the optical drive system with data that is known to have been written correctly without having to demount the platter 44 currently on the drive being tested. Being able to test the read and other functions without demounting of the platter is useful in order to identify problems caused by decentering.

Also illustrated in FIG. 6a is a second band 90 designated as the Index Band. As its name implies, the Index Band is reserved for the index of the information stored on the platter 44. The index contains up to two entries for each band on the platter. The Index Band entries are generally written with "short" blocks of data. (The distinction between "short" and "long" blocks is discussed below.) Indexing data written in the Index Band provides a quick and efficient method for determining what data has been written on the platter 44.

A third band 92 on the platter 44 is reserved as the Platter Table Of Contents (PTOC). The PTOC band 92 contains data which describes the state of the platter. The entries in the PTOC band 92 are generally written with long blocks.

Figure 6B:
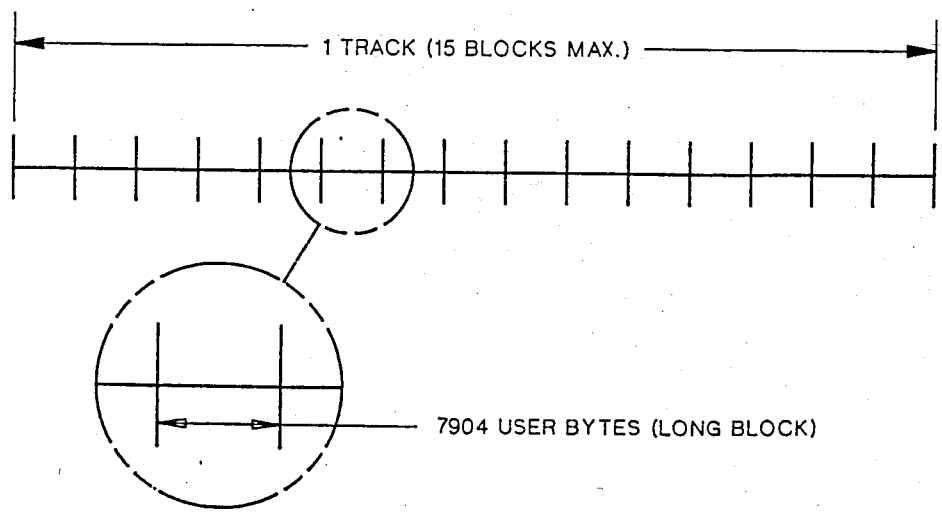

Data is organized on each track in fixed length logical units called blocks. One track may contain up to 15 long blocks, as symbolically illustrated in FIG. 6b. A data block is a byte sequence whose length is either 136 bytes (a short block) or 7912 bytes (a long block). Short blocks are used primarily for the Index Band 90. Long blocks are used for reading and writing user data, and are also used in the FE band 98 and the PTOC band 92. The maximum number of short blocks for a track is 222, and the maximum number of long blocks per track is 15. As will be explained hereinafter, the actual number of blocks may vary due to the number of defects encountered on the platter surface. Eight of the bytes contained within a short or long block are reserved as identification bytes. The remaining bytes are available for user data. Thus, there are 7904 user bytes in a long block, as indicated in FIG. 6b, and 128 user bytes in a short block.

Each track is physically divided into a fixed number of equal length segments referred to as "sectors." User data is encoded and defined into various types of sectors in order to be written to the platter 44. Other types of sectors, as explained below, are used to identify media or platter defects and incompletely written user data.

When the encoded data is written on the platter, a read back check is employed in order to verify that the data has been correctly written. If a data error is detected, the sector is rewritten in such a way that during a normal read operation, the bad sector (the one containing the incorrect data) can be identified and ignored. In order to properly identify defective sectors, an additional sequence of sectors are thus appended to every logical data block prior to having it written on the platter. These additional sequence of sectors may be thought of as subsystem overhead sectors. The combination of the logical data block (the user data) and the subsystem overhead sectors is referred to as a physical data block. The total number of sectors which comprise a physical data block may vary due to the number of media defects encountered while writing the block of data to the platter.

Figure 7:
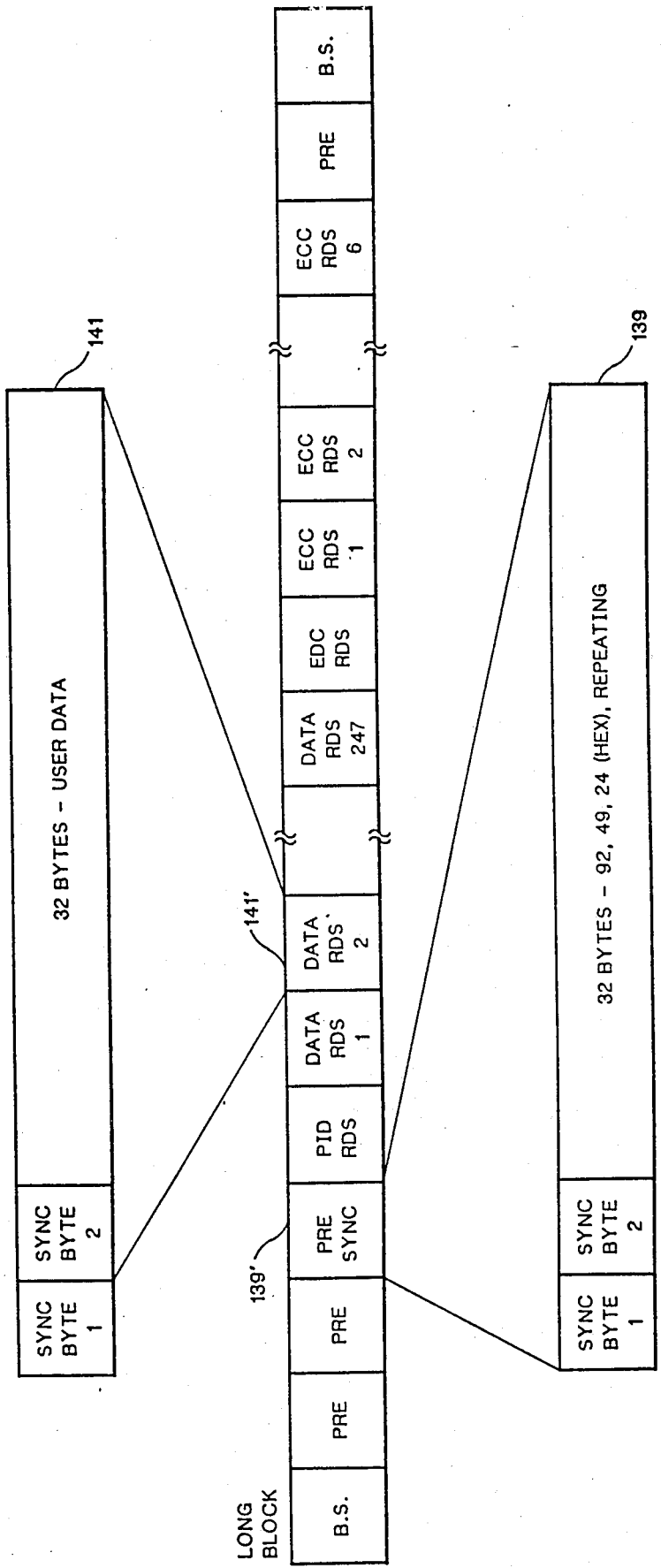
FIG. 7 is a diagram of the format used within a long block of data.

In the absence of detected errors, the physical data blocks recorded on a given track have a format as depicted in FIG. 7. This format may be described as a sequence of sectors in the following order:
1. A block separator sector.
2. Two preamble sectors.
3. One preamble/resynchronizable data sector (Pre-/Resync sector).
4. One sector containing a physical identifier or Physical I.D. (PID). The PID is an 8-byte number supplied by the control electronics 52 (FIG. 2) whenever data is written to the platter. This 8-byte number indicates the band number, track number, and relative record number within a band.
5. Two hundred forty seven (long block) or four (short block) resynchronizable data sectors containing 7904 (long block) or 128 (short block) bytes of user data. This user data may include a logical ID (LID) and a KEY as well as the user data. The LID is a 8-byte logical ID supplied by the access method of the host CPU 22. As such, the LID is a part of the user record and can be used as an address, and its use is a user option. The KEY is a string of data of up to 64 bytes that is appended to user data, if desired, by the host access method. As such, the KEY is also a part of the user record and can be used for addressing purposes if desired. LID's and KEY's are thus optional identifiers that may be used to further identify and locate a particular block of user data.
6. An error detection code resynchronizable data sector (34 bytes).
7. Six resynchronizable data sectors containing the error correction code for the data (204 bytes).
8. A preamble sector/resynchronizable data sector (Pre/Resync).
9. A block separator sector.

From the above list, it is seen that a long block format (in the absence of detected errors) contains 261 total sectors, while a short block contains 18 total sectors. The sectors identified in items 3–8 above are all resynchronizable sectors, having two sync bytes at the beginning thereof.

Subsequent blocks are written beginning in the sector immediately following the last block separator of the previously written data block.

In the preferred embodiment, the block separator sector has a 1.6 MHz square wave written therein. A preamble sector, in contrast, has an 8 MHz square wave written therein. As indicated in FIG. 7, the preamble/resynchronizable data sector comprises two SYNC BYTES followed by an 8 MHz square wave. (Advantageously, the 8 MHz square wave can be generated by 2,7 encoding 92, 49, 24 repeating data.)

The physical identifier, or PID sector shown in FIG. 7, is comprised of two SYNC BYTES followed by 32 bytes of 2,7 encoded data comprising two identical copies of a 16 byte group of data (hex) as follows:
FF
FF
FF
One's complement Track Number.
One's complement Band High.
One's complement Band Low.
One's complement Relative Block High.
One's complement Relative Block Low.
00
00
00
Track Number.
Band high.
Band low.
Relative Block High.
Relative Block Low.

As those skilled in the art will recognize, FF and 00 are hex numbers. Tracks are numbered consecutively from the outermost track of the band to the inner most track of a band. The bands are likewise numbered beginning from the outermost band to the innermost band on the platter. Similarly, the blocks of data within a given track are consecutively numbered. By including within the PID sector both the one's compliment and the number itself of the track, band, and block, a positive identification can therefore be made.

As further indicated in FIG. 7, user data is written in Resynchronizable Data Sectors that comprise two SYNC BYTES followed by 32 bytes of encoded user data.

The Error Detection Code Resynchronizable Data Sector (EDC RDS) includes two SYNC BYTES followed by two bytes of 2,7 encoded data whose value is determined by a CRC computation of selected data sectors. For a short block, the CRC polynomial is $x^{16}+x^{15}+x^2+x+1$. The seed (initialization) pattern is "5D5D". Thirty bytes of 00 follow the EDC bytes to fill the resynchronizable data sector.

The error correction data, or error correction code (ECC), comprises two SYNC BYTES followed by 32 bytes of 2,7 encoded data whose value is determined by an interleaved READ SOLOMON computation on the selected data sectors and on the EDC resynchronizable data sector.

With the data stored on the platter formatted as described above, each block of data can be readily identified. This identification is made possible through the use of resynchronizable data sectors (RDS). These sectors are resynchronizable because of the unique sync pattern—comprising two SYNC BYTES—with which each RDS begins. It is the generation and detection of these SYNC BYTES that comprises the main elements of the invention claimed herein.

In the preferred embodiment, a 2,7 code is used for the encoding of the data. A 2,7 code is summarized in Table 1. Advantageously, the two SYNC BYTES that precede every resynchronizable sector maintain the 2,7 code constraints but cannot be encoded from the user data.

TABLE 1

| 2,7 CODE | |
|---|---|
| DATA WORD | CODE WORD |
| 10 | 0100 |
| 010 | 100100 |
| 0010 | 00100100 |
| 11 | 1000 |
| 011 | 001000 |
| 0011 | 00001000 |
| 000 | 000100 |

Figure 8:
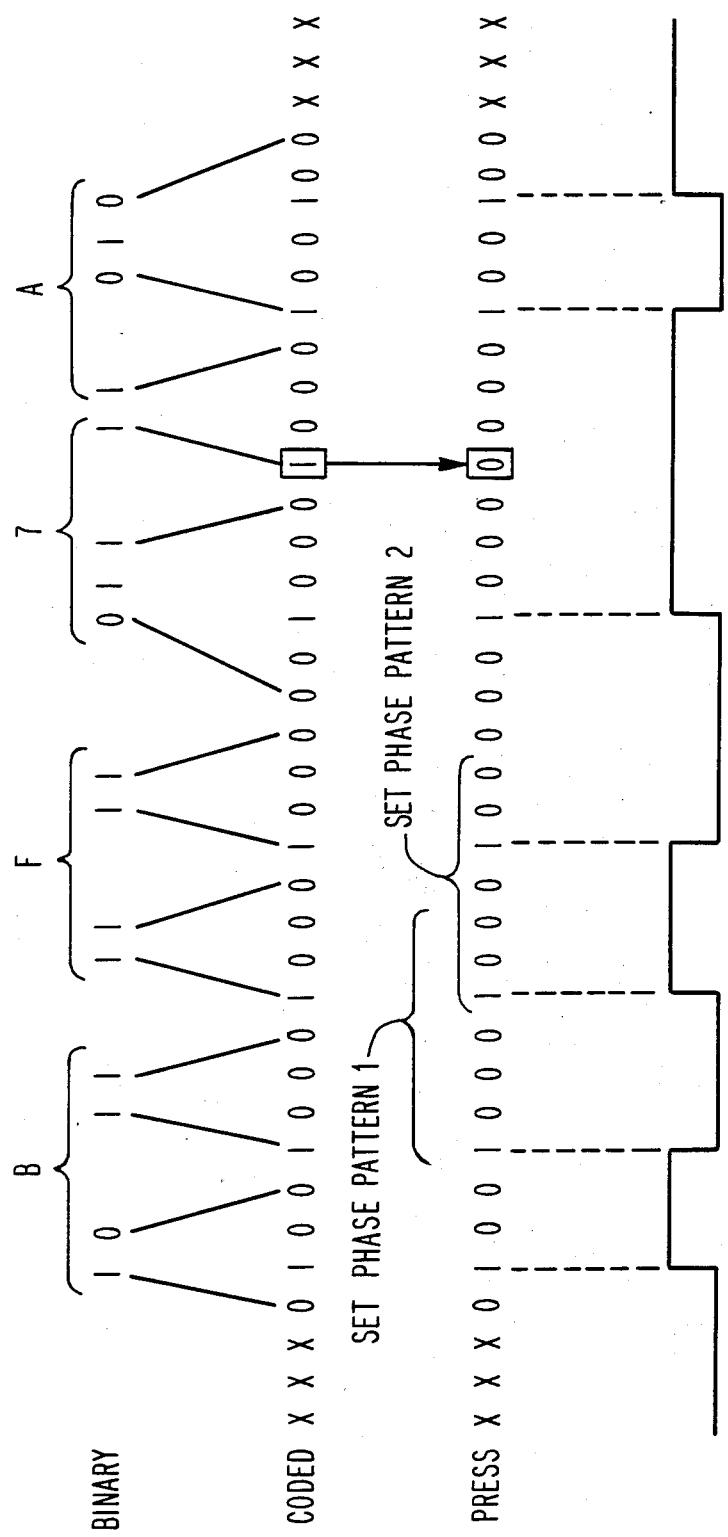
FIG. 8 is a bit diagram illustrating the generation of the sync bytes of the present invention.

The SYNC BYTES are used to establish a known bit position in the data stream. This position is required to allow the 2,7 decoding to begin at a code boundary in the bit stream and to determine the byte boundaries of the decoded data. The SYNC BYTES are located in the first two byte positions of the resynchronizable sectors as shown in FIG. 7. These resynchronizable sectors include the preamble preceding the physical identifier (PID), the PID, data, EDC, and ECC sectors of each data block. The SYNC blocks are defined by performing a 2,7 encoding of the hex word "BF7A" and modifying the result by changing a "1" to a "0" at the position indicated in FIG. 8. This modification advantageously prevents data from generating SYNC BYTES, but does not violate the 2,7 code rule as defined in Table 1. Additionally, the choice of this pattern provides the advantage of always completing a 2–7 group within the first two data bits, and this encodes the same way for each group of sync bytes (after the first two bits). This allows the predictable pattern (1000100) to appear twice in the encoded data, as indicated by Phase Pattern 1 and Phase Pattern 2 in FIG. 8. This pattern is used to properly phase the 2F clock from the PLL, with the IF clock being used to store the decoded data in a storage element.

Figure 9:
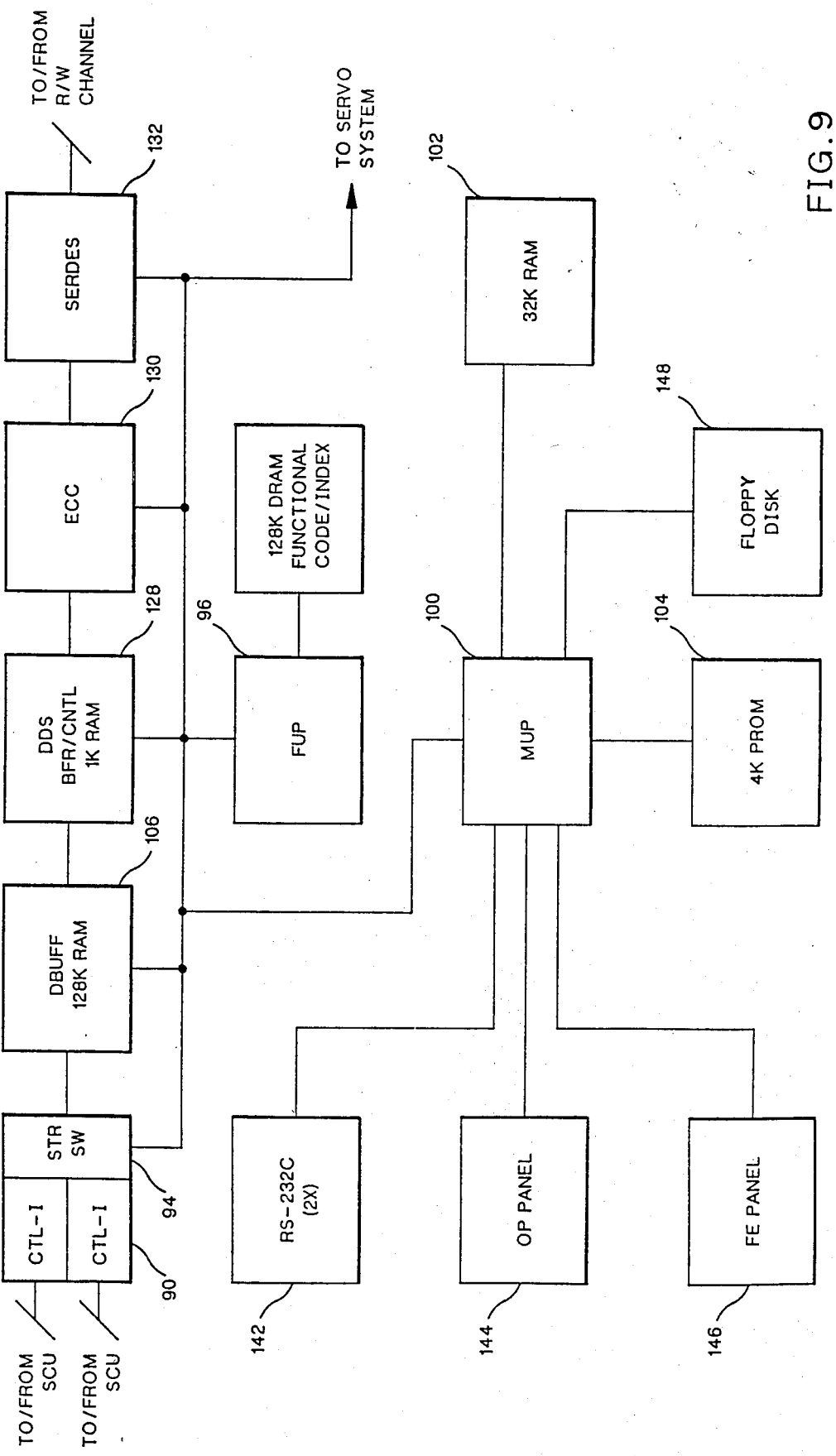
FIG. 9 is a block diagram of the control electronics of FIG. 4.

Referring next to FIG. 9, there is shown a block diagram of the control electronics 52 (FIG. 4) of the optical drive system 20. A brief description of the elements contained within the control electronics 52 will now be given so as to provide a better understanding of the best mode contemplated for carrying out the present invention. In FIG. 9, two control interfaces 90 and 92 are provided to enable communications with two separate storage directors of the storage control unit 24 (FIG. 1). Communication with two separate directors is provided to add flexibility to the particular configuration that will be used with the optical drive systems. A suitable switch 94 allows communication with either director to be selected.

A functional microprocessor 96 (FUP) performs the following functions within the optical drive system:
1. Hardware control.
2. Interpretation/execution of commands from the selected storage director.
3. Index buffer management.
4. Rapid band search (RBS).
5. Interrupt handling.
6. Status reporting.

Advantageously, this functional microprocessor 96 may be realized with a commercially available 16-bit processor chip, such as the MD 68000 manufactured by Motorola Semiconductor of Phoenix, Ariz.

Code for the microprocessor 96 may be stored in a suitable memory device 98, such as a 128K Dynamic Random-Access-Memory (DRAM). The DRAM 98 may also provide additional memory associated with the operation of the control electronics, such as index and other information.

A maintenance microprocessor (MUP) 100 is also used to provide the functions necessary for communications with and testing of the optical drive system 20. A 32K random access memory (RAM) 102 provides the necessary storage for the code associated with the maintenance microprocessor 100. Advantageously, the maintenance processor 100 may be realized with an identical chip as is the functional microprocessor 96. A 4K read only memory (ROM), such as a programmable ROM (PROM) 104, is used to provide the Boot and start-up code for the MUP 100 and the other start-up functions associated with the control electronics 52.

A Data Buffer (DBUF) provides temporary storage of data transferred for read/write operations and compensates for the different access rates associated with the optical drive system. Thus, it is used for matching the speed of data transfer with the transfer rate of the host CPU 22. In the preferred embodiment, the DBUF 106 has a data capacity of one track, or 128K bytes.

A Dynamic Defect Skipping (DDS) buffer and control block 128 provide the necessary buffering for rewriting data after detected defects and to control read transmitted data during read. The Dynamic Defect Skip function is used to assure the correctness of the data written on the platter 44. Immediately after the data is written on the platter, it is read back therefrom. The data read back is compared with the data written to the platter and if any differences exist then the data has been incorrectly written and is so marked. This process is repeated as many times as is necessary (within reason) in order to insure the correctness of the written data.

Suitable error correction code (ECC) circuitry 130 is employed in the data path to improve the data error rate during a read operation. As with all ECC schemes, this process involves properly encoding the data when it is written with a suitable code that when read back not only helps identify that an error has occurred but also provides the necessary information to correct the error in most cases. In the preferred embodiment, the error correction code that is used comprises a triple error correcting (255, 249) REED-SOLOMON code, interleaved to degree 32. Each of the 32 interleaves has 6 ECC bytes associated therewith for a total of 192 ECC bytes for each block of data. The location of the ECC bytes within the block is as shown in FIG. 7. Advantageously, the code is capable of correcting three symbols (bytes) in error per interleave. Because of this interleaving, this yields a first correction capability of 96 bytes. The code is designed to meet or exceed the criteria that no more than one uncorrectable error occur in $10E+13$ bits of data transferred.

The circuitry used to encode and decode the error correction code is advantageously shared between the encoding and decoding processes. This circuitry is described and claimed in a copending patent application, "Shared Encoder/Decoder Circuits for Use with Error Correction Codes of an Optical Disk System", assigned to the same assignee as the present application, and filed concurrently herewith, now U.S. Pat. No. 4,562,577.

Figure 10:
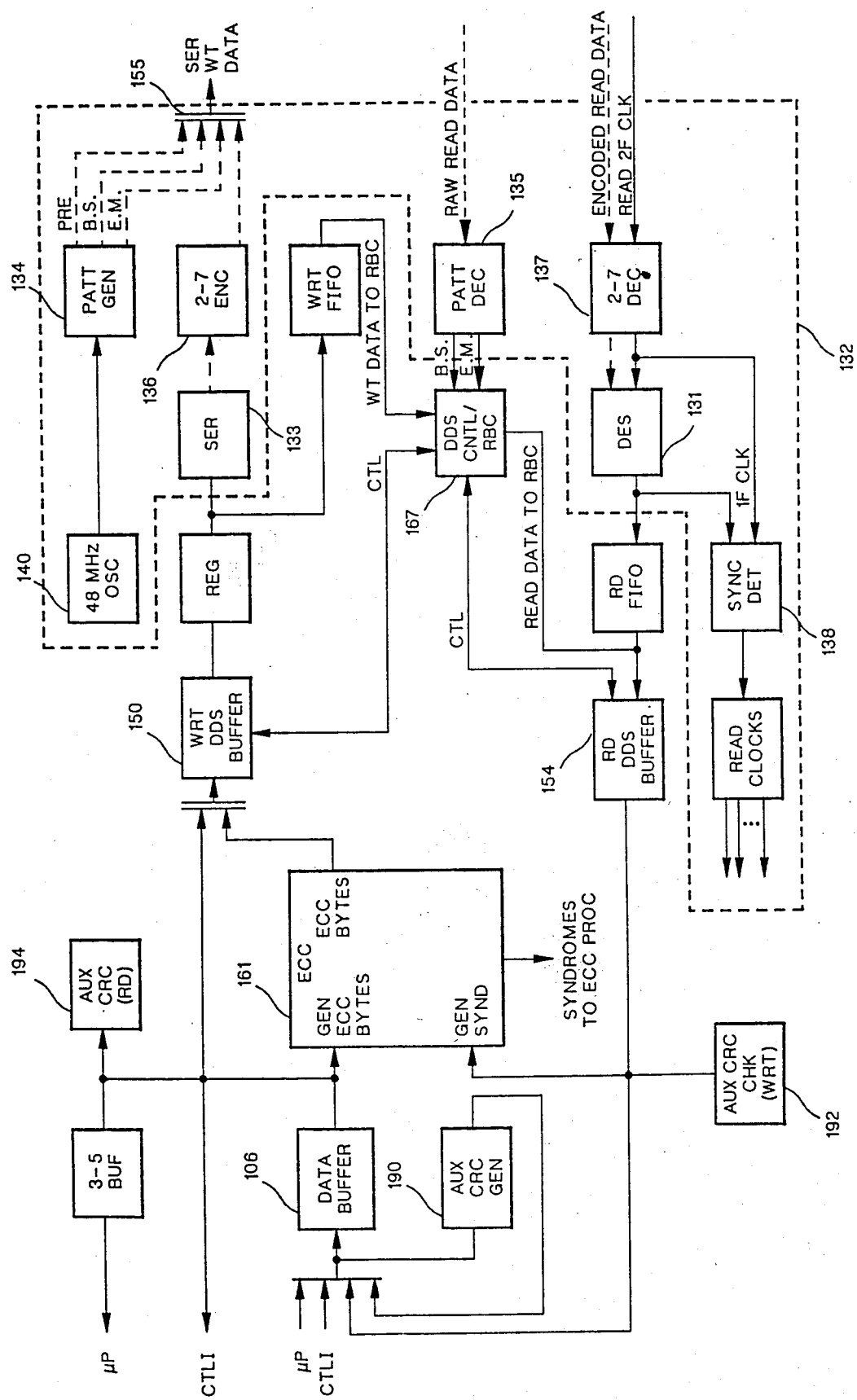
FIG. 10 is a block diagram illustrating the principle elements associated with the data path of the control electronics of FIG. 4.

Still referring to FIG. 9, a serializer/deserializer (SERDES) circuit 132 is used to take byte-serial channel data and convert it into bit-serial data to be written on the platter and visa-versa. The SERDES 132 circuitry comprises the elements enclosed within dotted line 132 of FIG. 10, which figure depicts the data path associated with the control electronics 52 (FIG. 4). As is evident from an examination of FIG. 10, the SERDES circuitry provides the desired encode/decode funciton. The translation from data to code words and back follows the pattern indicated in Table 1. The decode function performed at block 137 (FIG. 10), takes as inputs a 2F clock signal (obtained from the coarse servo tracks as described in copending patent application Ser. No. 501,956, filed June 7, 1983, assigned to the same assignee as is this application, now abandoned, and the detected data from the phase locked loop circuits and generates corresponding data bits. The decode function of the decoder 137 also provides error checking to detect the presence of "11" "101", or "00000000" patterns in the coded data. These bit patterns violate the rules for a 2,7 code.

There are a number of special patterns which must be inserted into the serial encoded bit-stream for formatting and for defect skipping purposes. These patterns include block separators, exception marks, and special resync characters. Thus, pattern generation circuitry 134 (FIG. 10) provides these characters to the data stream at the output of the 2,7 encoder 136.

Figure 11:
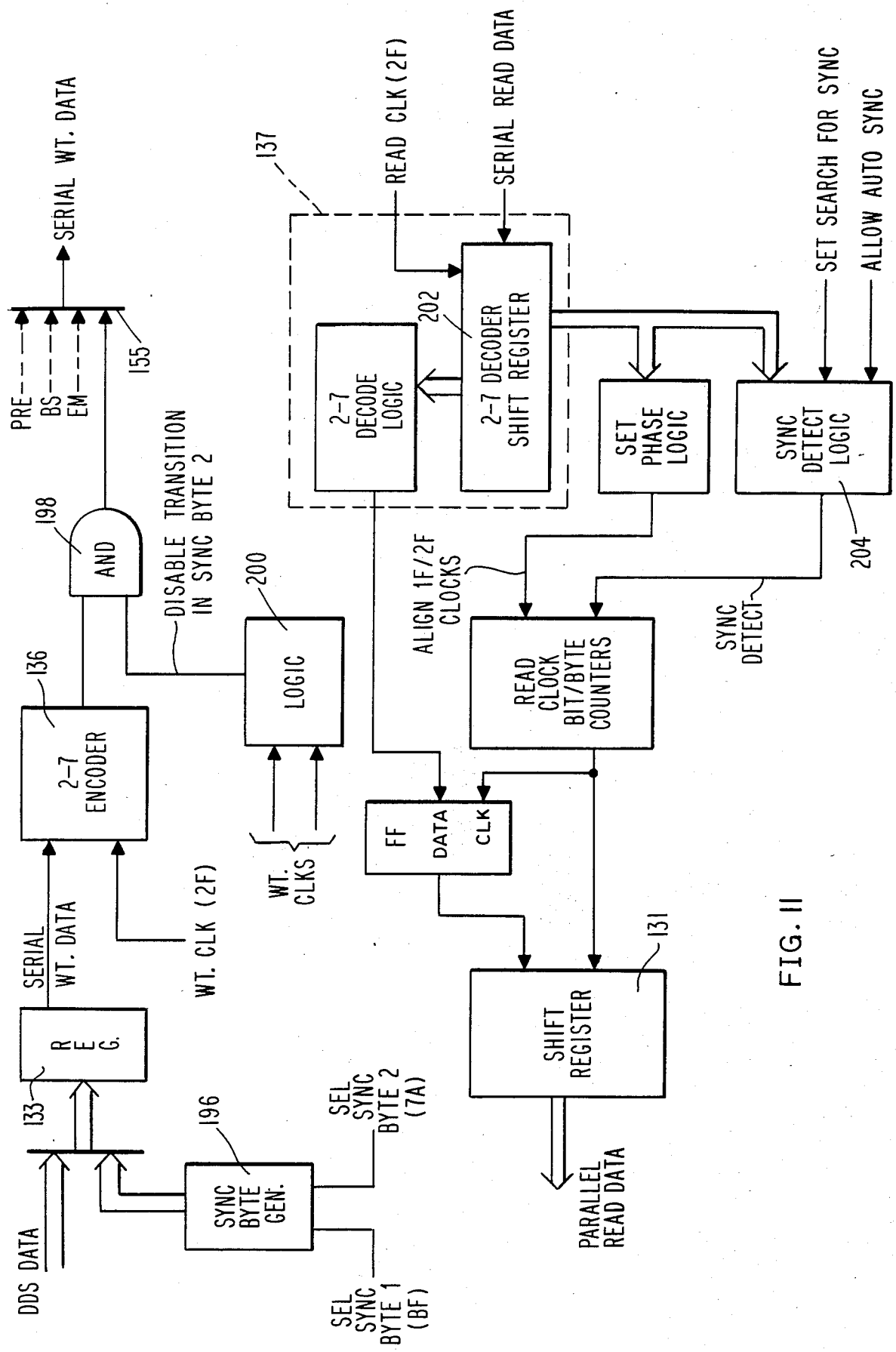
FIG. 11 is a block diagram of the sync byte generator circuitry used to realize the sync byte in FIG. 8.

A synchronizer circuit 138 provides the means to detect the beginning of a Resynchronizable Data Section (RDS) by decoding the special 2-byte field at the start of every RDS. (An RDS is that sequence of data bytes, such as is shown at 139 and 141 of FIG. 7 that is written into a data sector, such as 139' or 141' of a block of data). The circuit 138 also provides the means to acquire phase-sync for the 2,7 decoder and bit-sync for the data path. A block diagram of the synchronizer 138 is shown in FIG. 11, which figure is discussed more fully below.

In the preferred embodiment, the 2F frequency used in the generation of encoded data is derived from a crystal oscillator 140 running at 48 MHz. Other clocks used in the data path are all derived from this frequency. The clocks are distributed throughout the control electronics 52 (FIG. 4) as a 1F clock signal (24 MHz) and as four 12 MHz clock signals, each derived from the 1F clock and offset from each other by 90°.

Referring back to FIG. 9, an RS-232 interface 142 is provided within the control electronics in order to allow communication with the optical drive system 20 through the use of any suitable diagnostic tool on either a local or remote basis. An operator panel 144 provides the controls and indicators necessary for operator use in completing a power up/down sequence, or in a load-/unload of a cartridge 32. An FE panel 146 provides to the field engineer a manner of controlling and monitoring the operation of the optical drive system 20 so that proper diagnostics and tests can be run. A floppy disk 148, preferably an 8-inch floppy disk, provides storage for the maintenance processor 100 microde, diagnostic microcode, and error log information.

Certain special conditions (such as the start of a block, platter defects, etc.) are indicated on the platter by writing two unique frequencies. The block separator (BS) sector is a 1.5 MHz square wave. The exception mark (EM) sector is a 2.0 MHz square wave. These frequencies are outside the range of data. (Data frequencies range from 3 MHz to 8 MHz.) A third special function frequency, the preamble, is used to synchronize a PLL and thus is the highest frequency recorded (8 MHz). The preamble resides in the data range. These frequencies are written in burst and in a integral number of RDS's in length. In order to detect the presence of these special conditions as indicated by these frequencies, the Block Separator/Exception Mark/Preamble Decoder circuit 135 (FIG. 10) is employed.

Referring next to FIG. 11, a block diagram of the sync byte generation and detection circuitry is shown. Many of the elements shown in FIG. 11 are also found in FIG. 10, but the particular arrangement of the elements in FIG. 11 helps clarify the function performed. Parallel write data from the DDS Buffer 150 (FIG. 11) is directed to a serializer register 133. A Sync byte generator 196 selectively intersperses the sync word "BF7A" with the data in the serializer 133. The serial data from the serializer 133 is sent to the 2,7 Encoder 136 where it is encoded according to the pattern shown in Table 1. This data is then gated through an AND gate 198, the output of which is coupled to a serial write data bus 155. Logic circuitry 200 determines when the particular transition (bit) of the unchanged sync word is present (see FIG. 8) so that this bit may be surpressed, thereby generating the desired sync byte.

The sync byte is sensed by monitoring read bytes as they pass through the 2,7 decoder shift register 207. Sync byte detect logic 204 is configured to generate a sync detect signal whenever the prescribed sync byte bits are present. This sync detect signal is used to organize the read data into correct parallel data bytes.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A method of generating a unique sync pattern for use with a group of valid data words that are encoded according to a prescribed fixed rate run-length limited code, said method comprising the steps of:
    (a) encoding a prescribed data word in accordance with said fixed rate run-length limited code; and
    (b) changing at least one of the bits of said enclosed prescribed data word such that the resulting bit pattern of the changed encoded prescribed word still complies with the coding requirements of the prescribed fixed rate run-length limited code yet does not represent any valid encoded data word that can occur through encoding data according to said code, whereby the changed encoded word may be distinguished from other encoded data words, yet processed and handled in the same manner as are all the data words encoded in accordance with said prescribed fixed run-length limited code, wherein the prescribed fixed rate run-length limited code is a 2,7 code, and said prescribed data word comprises the word "BF7A" (hex), whereby said word when encoded in accordance with said 2,7 code is converted to a first code word comprising "0100100010001000001000000100100".

2. The method of claim 1 wherein step (b) comprises changing the sixth "1" from the left end of said first code word (the third "1" from the right end of the first code word) to a "0", whereby a second code word is created comprising "0100100010001000001000000100100", which second code word comprises a unique sync pattern that complies with the coding rules of 2,7 codes yet does not represent any valid sequence of encoded data bits that can occur through use of a 2,7 code.

3. The method of claim 1 further including the step of appending at least two of said changed encoded words to an end of the group of data words with which the sync pattern is to be used.

4. A system for generating a unique sync pattern and using same with a group of encoded data words encoded according to a specified fixed rate run-length limited code, said system comprising:
    means for encoding a prescribed data word in accordance with the specified fixed length run-length limited code;
    means for changing at least one of the bits of said encoded prescribed data word such that the resulting bit patter of the changed encoded prescribed word still complies with the coding requirements of the specified fixed run-length limited code, yet does not represent any valid sequence of encoded data bits representing one of said group of encoded data words, thereby generating said unique sync pattern and means for appending the resulting changed encoded prescribed word to said group of encoded words wherein the specified fixed rate run-length limited code is a 2,7 code, and said prescribed data word comprises, in hex representation, the word "BF7A", whereby said word when encoded in accordance with said 2,7 code is converted to a first code word comprising "010010001000100001000100100".

5. The system of claim 4 wherein the means for changing at least one of the bits of said first code word comprises means for changing the sixth "1" from the left end of said first code word to a "0", whereby a second code word is created comprising "010010001000100001000000100100", which second code word comprises said unique sync pattern.

6. The system of claim 4 wherein a plurality of the changed encoded prescribed words are joined contiguously to comprise said unique sync pattern.

7. The system of claim 6 wherein the other encoded data words with which the unique sync pattern may be used are grouped into a series of sectors, each sector comprising that amount of data that may reside in a fixed length of a data track wherein data of a data processing system may be stored, a prescribed series of said sectors comprising a data block, and wherein the unique sync pattern is appended to selected sectors within each data block, each of the sectors having the sync pattern attached thereto thereby comprising a resynchronizable data sector.

* * * * *

UNITED STATES PATENT AND TRADEMARK OFFICE
CERTIFICATE OF CORRECTION

PATENT NO. : 4,697,167
DATED : September 29, 1987
INVENTOR(S) : Michael J. O'Keeffe et al.

It is certified that error appears in the above-identified patent and that said Letters Patent is hereby corrected as shown below:

Column 10, line 11, after "one's", delete "compliment" and substitute therefor --complement--;
Column 10, line 36 and 37, after "sync" on line 36, delete "patter-n" and substitute therefor --pattern--;
Column 11, line 6, after "a", delete "2-7" and substitute therefor --2,7--;
Column 12, line 49, after "decode", delete "funciton" and substitute therefor --function--;
Column 13, line 32, after "100", delete "microde" and substitute therefor --microcode--;
Column 14, line 20, after "said", delete "enclosed" and substitute therefor --encoded--;
Column 14, line 62, after "bit", delete "patter" and substitute therefor --pattern--;
Column 14, line 24, after "limited" delete "code" and substitute therefor --code,--;
Column 14, line 37, after "comprising" delete ""0100100010001000010000000100100"" and substitute therefor --"0100100010001000010001000100100"--.

Signed and Sealed this

Twenty-ninth Day of March, 1988

Attest:

DONALD J. QUIGG

Attesting Officer     Commissioner of Patents and Trademarks